United States Patent [19]

Ohmori et al.

[11] Patent Number: 5,570,936
[45] Date of Patent: Nov. 5, 1996

[54] FLUID PRESSURE CONTROL METHOD OF AN ANTI-SKID CONTROL APPARATUS FOR VEHICLE

[75] Inventors: Mitsunao Ohmori; Motoo Yokota, both of Yokohama, Japan

[73] Assignee: Nippon A B S, Ltd., Yokohama, Japan

[21] Appl. No.: 432,963

[22] Filed: May 1, 1995

[30] Foreign Application Priority Data

May 2, 1994 [JP] Japan .................................. 6-115921
Oct. 12, 1994 [JP] Japan .................................. 6-272905

[51] Int. Cl.$^6$ ...................................................... B60T 8/00
[52] U.S. Cl. .................................... 303/170; 303/187
[58] Field of Search .................................. 303/163, 164, 303/170, 187, 116.1, 113.1, DIG. 6, 900, 901; 364/426.02

[56] References Cited

U.S. PATENT DOCUMENTS

| 4,925,254 | 5/1990 | Holst et al. | 303/111 |
| 5,401,082 | 3/1995 | Fuchs et al. | 303/111 |

FOREIGN PATENT DOCUMENTS

| 0307588A3 | 3/1989 | European Pat. Off. . |
| 0502335A1 | 9/1992 | European Pat. Off. . |
| 2539687 | 7/1984 | France . |
| 2135413 | 8/1984 | United Kingdom . |
| 2136519 | 9/1984 | United Kingdom . |
| 91/05685 | 5/1991 | WIPO . |
| 92/20555 | 11/1992 | WIPO . |

Primary Examiner—Josie Ballato
Attorney, Agent, or Firm—Carothers & Carothers

[57] ABSTRACT

A fluid pressure control method of an anti-skid control apparatus for a vehicle, wherein the anti-skid control apparatus includes a tandem master cylinder, wheel cylinders of wheels, wheel speed sensors associated with the respective wheels, a control unit receiving the outputs of the wheel speed sensors for judging skid conditions of the respective wheels, and fluid pressure control valves arranged between the tandem master cylinder and the respective wheels, which receive instructions from the control unit for controlling brake fluid pressures of the respective wheels. The control unit supplies brake-decreasing instructions and brake-holding instructions independently to the ones of the fluid-pressure control valves for the front wheels, controls the others of the fluid-pressure control valves for the rear wheels by the diagonal "Select Low" between the skid conditions of the respective rear wheels and respective front wheels diagonally connected to the respective rear wheels. When the brake-decreasing instruction or the brake-holding instruction is supplied to the fluid pressure control valve for the rear wheel, on the basis of the control signal representing the skid condition of the front wheel diagonally connected to the the rear wheel, the control signal representing the skid condition of the front wheel is used for the fluid pressure control valve for the the rear wheel, at a predetermined rate responsive to the control condition of the the front wheel and/or the braked condition of the vehicle.

7 Claims, 6 Drawing Sheets

Control signal            Change-over valve

FLUID PRESSURE CONTROL METHOD OF AN ANTI-SKID CONTROL APPARATUS FOR VEHICLE

BACKGROUND OF THE INVENTION

1. Field of the Invention

This invention relates to a fluid pressure control method of an anti-skid control apparatus for a vehicle by which a brake fluid pressure of a wheel cylinder can be controlled in accordance with a skid condition of a wheel.

2. Description of the Prior Art

Various fluid pressure control methods have been developed for anti-skid control apparatus. In one fluid pressure control method, wheel speed sensors are arranged for four wheels, respectively. A fluid pressure control valve is provided for front and rear wheels diagonally connected to each other. Fluid pressures of the front and rear wheels are decreased and maintained at constant by "Select-Low" control.

In another fluid pressure control method, there is provided pressure-selecting means (so-called "Select-Low Valve") between both front wheels and both rear wheels. The fluid pressure control valves are controlled by "Select-Low" control of the front and rear wheels on the same side of the road.

The above methods have the respective effects, and assure the driver of safety. However, it is required for more accurate anti-skid control that wheel speed sensors and fluid pressure control valves be provided for the respective wheels. Such an anti-skid control apparatus is a so called "four-channel, four-sensor type". A control unit judges the respective skid conditions of the wheels, and generates control signals representing the skid conditions of the respective wheels. There are two kinds of control methods for the four-channel, four-sensor type control unit. One is a "Select-Low" control of the two rear wheels. Another is "Independent control" of the two rear wheels. In the "Select-Low", when a control signal, namely a decreasing control signal or a holding control signal is generated from any one of the two rear wheels, both of the rear wheels are controlled on the basis of the generated control signal, although no control signal is generated from another rear wheel.

FIG. 1 shows a logic diagram of the "Select-Low". "AVFL", "AVRR", "AVRL", "AVFR" on the left of FIG. 1 represent AV signals (brake decreasing control signals-"AV" means "brake decreasing") of left front wheel (FL), right rear wheel (RR), left rear wheel (RL) and right front wheel (FR), respectively. And "EVFL", "EVRR", "EVRL", "EVFR" on the left of FIG. 1 represent EV signals (brake holding signals-"EV" means "brake holding") of left front wheel (FL), right rear wheel (RR), left rear wheel (RL) and right front wheel (FR), respectively. "(AVFL)", "(AVFR)" on the right of FIG. 1 represent drive signals (AV) for driving change-over valves to decrease the brake fluid pressures of the front left and rear wheels, respectively, and "(EVFL)", "(EVFR)" on the right of FIG. 1 represent drive signals (EV) for driving change-over valves to hold the brake fluid pressure of the front left and rear wheels. The drive signals (AV) and (EV) are formed in drive circuits $L_1$ and $L_2$. The above control signals AVRR, EVRR, AVRL and EVRL are supplied to a Select-Low circuit Q. The circuit Q includes a drive circuit. It generates a drive signal (AV-RR&RL) for driving change-over valves to decrease the brake fluid pressures of the rear left and rear wheels or another drive signal (EV-RR&RL) for driving the change-over valves to hold the brake fluid pressures of the rear left and rear wheels. The change-over valve for the front wheel FL or FR is controlled independent of the skid conditions of another front wheel FR or FL and the rear wheels RL and RR. However, the rear wheels are controlled in the "Select-Low", and both of the rear wheels are controlled in the same manner.

However, when the vehicle is running on a split road in which the coefficients (μ) of the sides are remarkably different from each other, or when the vehicle is cornering, both of the rear wheels are controlled in accordance with the one rear wheel on the low-μ side or the inside during the cornering, in the "Select-Low" method. A larger braking force to be applied, cannot be applied to the other rear wheel on the high-μ side or the outside, although they are not yet at a locked state. Indeed, the security or safety can be obtained, but the braking distance is lengthened. That is a disadvantage.

As above described, in the "Select-Low" manner, both of the fluid pressures of the rear wheels are controlled in accordance with the skid condition of the one rear wheel on the low-μ side. Accordingly, when the difference between the coefficients of the road sides is remarkably large, a braking force of the other rear wheel on the high-μ side becomes very small in contrast to a braking force to be applied. When a load applied to the rear wheels is larger, the above tendency is more remarkable.

On the other hand, when the fluid pressures of the left and right rear wheels are controlled independently of each other, braking forces to the rear wheels can be larger than in the "Select-low" method. However, the stability of the vehicle is deteriorated. There is some difference between the coefficients of the road sides. When the difference is large, the deterioration of the steering stability is remarkable. The reason is that a braking force to the one rear wheel on the low-μ side is small, and that a braking force to the other rear wheel on the high-μ side is large. In that case, a rotational force is imparted around the center of gravity of the vehicle. It is a so called "Spinning force". Over-steering tendency becomes remarkable. When the vehicle is cornering, a similar tendency occurs. The spinning of the vehicle is very dangerous. Further, when a braking force is larger, the wheel is apt to lock. The side force is decreased. The vehicle is apt to slip sidewards. As above described, in the "Dependent Control" of the rear wheels, the side force of the rear wheel is decreased and so it is difficult to obtain the runnning stability of the vehicle.

SUMMARY OF THE INVENTION

Accordingly, it is an object of this invention to provide a fluid pressure control method of an anti-skid control apparatus of the type "four-sensor, for a vehicle", can which remove the above described disadvantages, and by which the stability of the vehicle can be obtained and the braking distance can be shortened.

In accordance with an aspect of this invention, a fluid pressure control method of an anti-skid control apparatus for a vehicle is provided wherein said anti-skid control apparatus including;
(a) a tandem master cylinder,
(b) wheel cylinders of wheels,
(c) wheel speed sensors associated with the respective wheels,
(d) a control unit receiving the outputs of said wheel speed sensors for judging skid conditions of the respective wheels, and (e) fluid pressure control valves arranged between said tandem master cylinder and the respective wheels, receiving instructions from said control unit for controlling brake fluid pressures of the respective wheels, and said control unit supplies brake-decreasing instructions and brake-holding instructions independently to the ones of said fluid-pressure control valves for the front wheels, controls the others of said fluid-pressure control valves for the rear wheels by the diagonal "Select Low" between the skid conditions of the respective rear wheels and respective front wheels diagonally connected to said respective rear wheels, and when said brake-decreasing instruction or said brake-holding instruction is supplied to the fluid pressure control valve for the rear wheel, on the basis of the control signal representing the skid condition of the front wheel diagonally connected to the said rear wheel, the control signal representing the skid condition of the said front wheel is used for the fluid pressure control valve for the said rear wheel, at a predetermined rate responsive to the control condition of the said front wheel and/or the braked condition of said vehicle.

In accordance with another aspect of this invention, a fluid pressure control method of an anti-skid control apparatus for a vehicle is provided wherein said anti-skid control apparatus includes;
(a) a tandem master cylinder,
(b) wheel cylinders of wheels,
(c) wheel speed sensors associated with the respective-wheels,
(d) a control unit receiving the output of said wheel speed sensors for judging skid conditions of the respective wheels, and
(e) fluid pressure control valves arranged between said tandem master cylinder and the respective wheels, receiving instructions from said control unit for controlling brake fluid pressures of the respective wheels, and said control unit supplies brake-decreasing instructions, brake-holding instructions and brake-increasing instructions independently to the ones of said fluid-pressure control valves for the front wheels, controls the others of said fluid-pressure control valves for the rear wheels by the diagonal "Select Low" between the the skid conditions of the respective rear wheels and respective front wheels diagonally connected to said respective rear wheels, and when said brake-decreasing instruction, said brake-holding instruction or said brake-increasing instruction is supplied to the fluid pressure control valve for the rear wheel, on the basis of the control signal representing the skid condition of the front wheel diagonally connected to the said rear wheel, the control signal representing the skid condition of the said front wheel is used for the fluid pressure control valve for the said rear wheel, at a predetermined rate responsive to the control condition of the said front wheel, the braked condition of said vehicle and the stability of the rear wheels.

In accordance with a further aspect of this invention, a fluid pressure control method of an anti-skid control apparatus for a vehicle is provided wherein said anti-skid control apparatus includes;
(a) a tandem master cylinder,
(b) wheel cylinders of wheels,
(c) wheel speed sensors associated with the respective wheels,
(d) a control unit receiving the output of said wheel speed sensors for judging skid conditions of the respective wheels, and
(e) fluid pressure control valves arranged between said tandem master cylinder and the respective wheels, receiving instructions from said control unit for controlling brake fluid pressures of the respective wheels, and said control unit supplies brake-decreasing instructions and brake-holding instructions independently to the ones of said fluid-pressure control valves for the front wheels, controls the others of said fluid-pressure control valves for the rear wheels by the diagonal "Select Low" between the skid conditions of the respective rear wheels and respective front wheels diagonally connected to said respective rear wheels, when the speed of said vehicle is higher than a predetermined value, and when said brake-decreasing instruction or said brake-holding instruction is supplied to the fluid pressure control valve for the rear wheel, on the basis of the control signal representing the skid condition of the front wheel, the control signal representing the said skid condition of the front wheel is used for the fluid pressure control valve for the said rear wheel, at a predetermined rate responsive to the control condition of the front wheel and/or the braked condition of said vehicle, and when the speed of said vehicle is lower than said predetermined speed, said control unit controls said other fluid pressure valves for the rear wheels by the left-right "Select Low" between said rear wheels.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENTS

Next, anti-skid apparatus for a vehicle according to one embodiment of this invention will be described with reference to the drawings.

Figure 1:
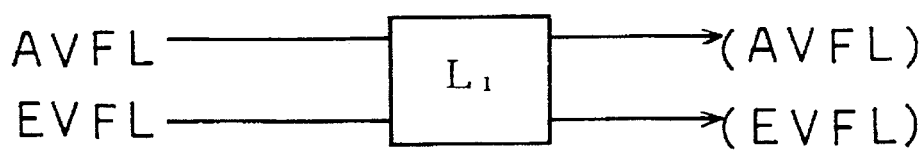
FIG. 1 is a block diagram of a logic circuit in the control unit of the Prior Art.
Figure 1:
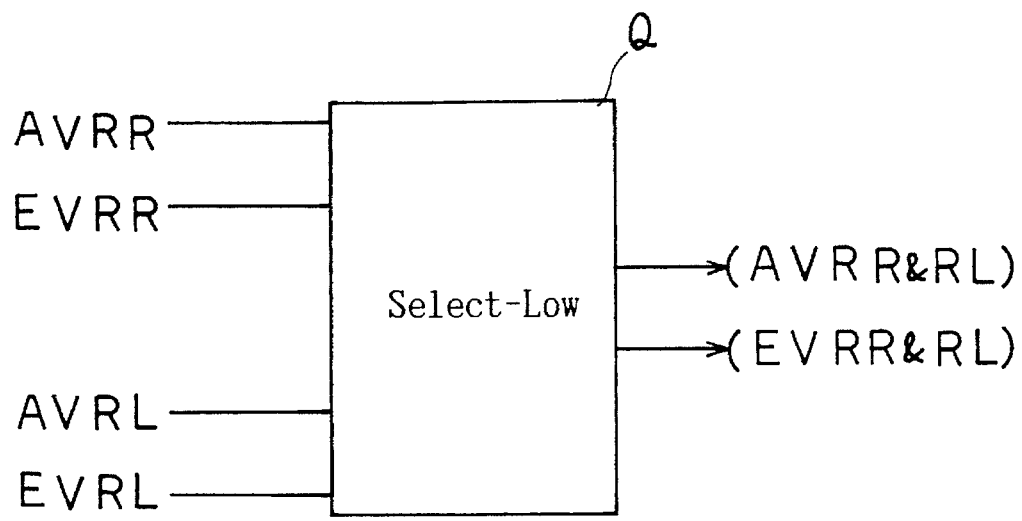
Figure 1:
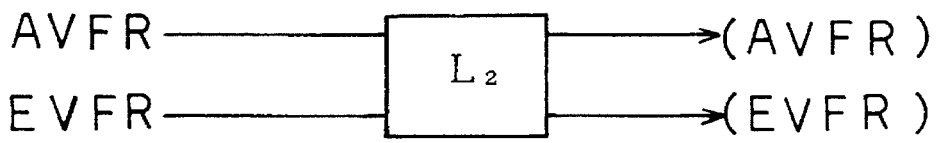
Figure 2:
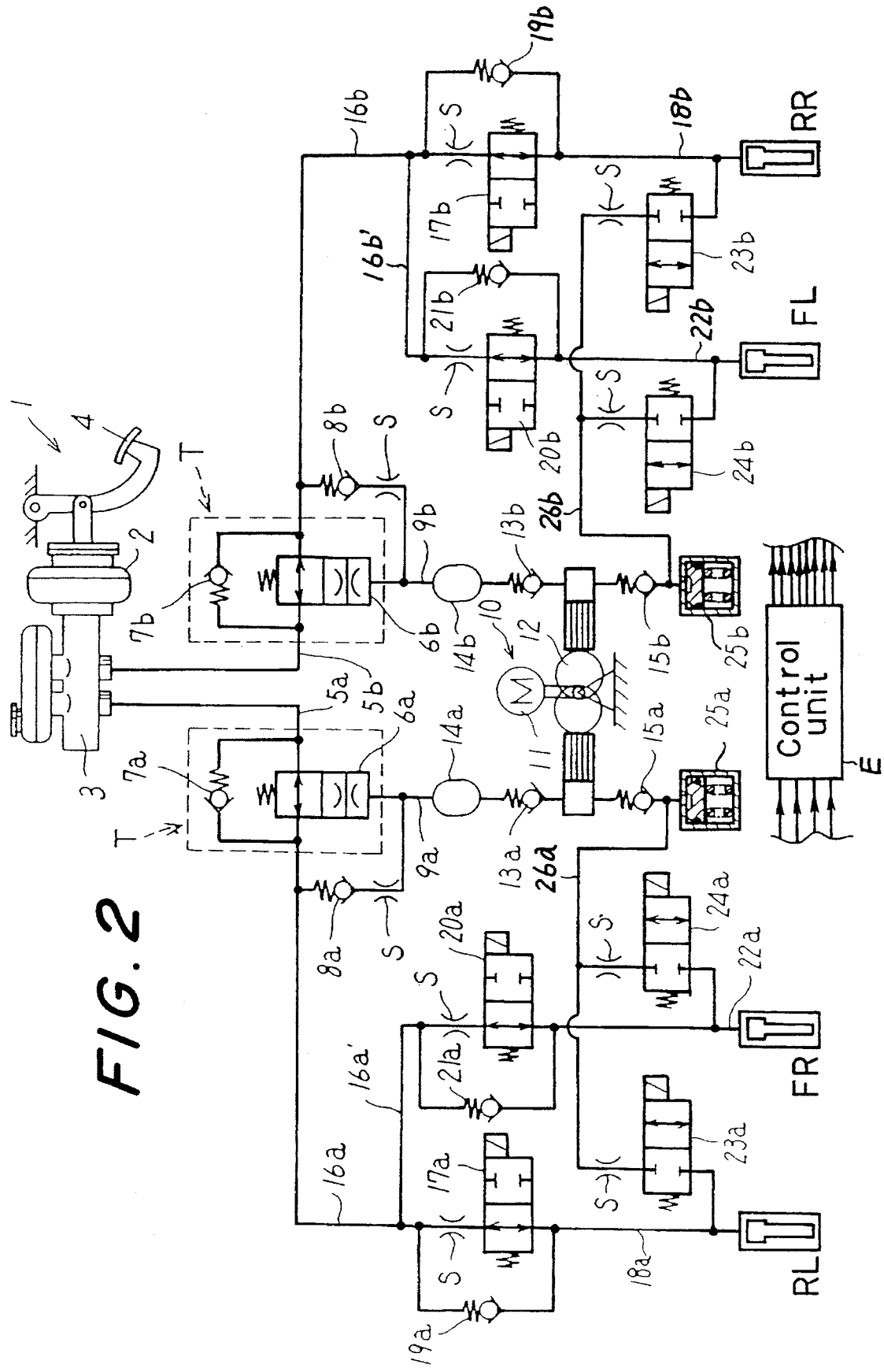
FIG. 2 is a conduit system of an anti-skid controler apparatus for vehicle according to one embodiment of this invention.

In FIG. 2, a master cylinder with booster 1 is connected to a brake pedal 4. A booster portion 2 and a fluid pressure generating part 3 have a well-known construction. The fluid pressure generating part 3 includes two fluid pressure generating chambers. They are connected to conduits 5a and 5b. An X-connection system which is called "diagonal" connection type, also, is employed for this embodiment. Wheel cylinders of right front wheel FR and left rear wheel RL are connected through valve members to be described here-after to, the conduit 5a. Wheel cylinders of right rear wheel RR and left front wheel FL are connected through similar valve members to the other conduit 5b. The same conduit constructions are connected to the conduits 5a and 5b. One brake conduit system for the right front wheel FR and the left rear wheel RL will be described. The corresponding parts in another brake conduit system are denoted by suffix b instead of suffix a.

Figure 3:
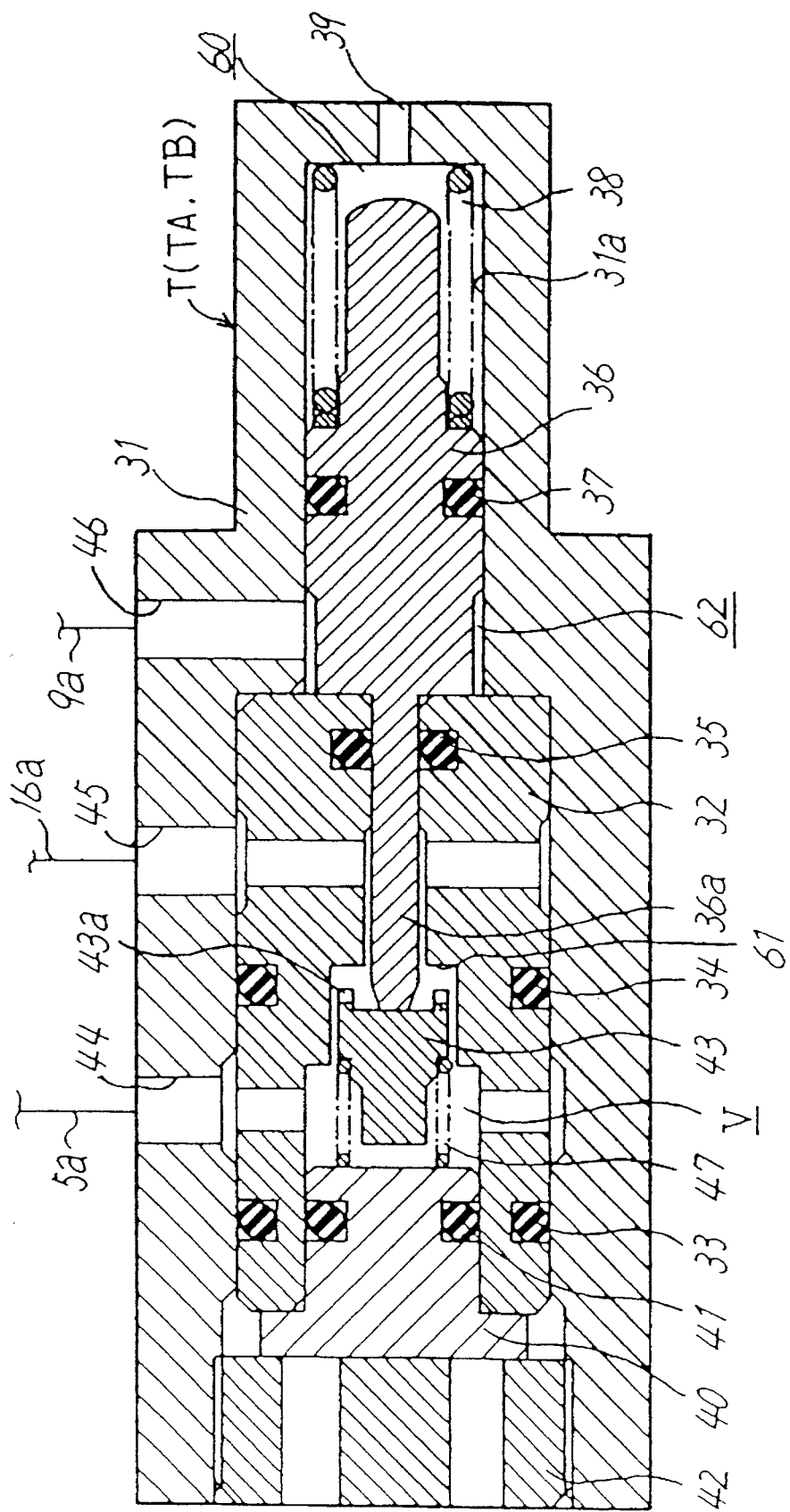
FIG. 3 is an enlarged cross-sectional view shouwing detail of a throttle valve apparatus shown in FIG. 2.

A throttle valve apparatus 6a is connected to the conduit 5a. A check valve 7a is connected in parallel with the throttle valve apparatus 6a. It permits fluid to flow from the wheel cylinder side toward the master cylinder side. But, it prohibits fluid to flow from the master cylinder side toward the wheel cylinder side. The throttle valve apparatus 6a and the check valve 7a are formed integrally with each other in this embodiment. The details of the throttle-check valve apparatus T is shown in FIG. 3. The valve apparatus 6a is connected through a conduit 16a to an inlet valve 17a and a conduit 18a to a wheel cylinder of the left rear wheel RL. A check valve 19a is connected in parallel with the inlet valve 17a. It permits fluid to flow from the wheel cylinder side toward the master cylinder side, while it prohibits fluid to flow from the master cylinder side toward the wheel cylinder side.

Conduit 16a' divided from the conduit 16a is connected to another inlet valve 20a and connected through a conduit 22a to a wheel cylinder of the right front wheel FR. A check valve 21a is connected in parallel with the inlet valve 20a. It permits fluid to flow from the wheel cylinder side toward the the master cylinder side, while it prohibits fluid to flow from the master cylinder side toward the wheel cylinder side.

Further, outlet valves 23a and 24a are connected to the wheel cylinders of the right front wheel FR and the left rear wheel RL and they are connected to a hydraulic low-pressure reservoir 25a. The low-pressure reservoir 25a has a well-known construction. A piston is slidably fitted into a casing which is urged upward by a weak spring. A reservoir chamber is formed above the piston in it. A fluid pressure pump 10 is connected in common with another hydraulic low-pressure reservoir 25b. The fluid pressure pump 10 has a well-known construction. An eccentric cam mechanism 12 is driven by an electric motor 11 in the fluid pressure pump 10. Two pistons are backward and forward driven, and positive pressure and negative pressure are alternately generated in the fluid pressure chambers formed at both sides of the pistons. A check valve 15a is connected to the fluid pressure chamber. A brake fluid is sucked from the reservoir 25a. The fluid pressure chamber is connected through a check valve 13a to a dumper 14a. The dumper 14a has a well-known construction. A fluid pressure discharged through the check valve 13a is transmitted to the conduit 16a through the dumper 14a and a check valve 8a. The throttle valve apparatus 6a, the detail of which is shown in FIG. 3, is connected through a conduit 9a to the dumper 14a. The check valve 8a is connected in a conduit divided from the conduit 9a. It permits fluid to flow from the dumper 14a side toward the master cylinder side, while it prohibits fluid to flow from the master cylinder side toward the dumper 14a side.

The inlet valves 17a and 20a and the outlet valves 23a and 24a are electro-magnetic change over valves. They have solenoid portions. When the solenoid portions are not energized, they take communicating positions or cut positions shown in FIG. 2. And when the solenoid portions are energized, they are changed over to take the cut positions or the communicating positions.

When the fluid pressure of the conduit 9a becomes higher than a predetermined value, the throttle valve apparatus 6a is changed to take a throttling position, from the communicating position.

Next, the detail of the throttle valve apparatus 6a will be described reference to FIG. 2.

A stepped hole 31a is formed in a housing 31. A sleeve 32 provided with seal rings 33 and 34 are fitted into the stepped hole. A stepped hole is formed in the sleeve 32. An annular groove is formed in a smaller diameter portion of the stepped hole and a seal ring 35 is fitted into the annular groove. A smaller diameter portion 36a of a fluid pressure drive piston 36 is slidably fitted into the seal ring 35. Further, a seal ring 37 is fitted into a larger diameter portion of the piston 36. It is urged leftward by a spring 38 and it contacts normally with the sleeve 32.

A plug member 40 provided with a seal member 41 is fitted into the sleeve 32 at the left opening end of the housing 31. A nut 42 is screwed into the left opening end of the housing 31 and it fastens the plug member 40.

A valve chamber V is formed in the inside hole of the sleeve 32. A valve body 43 is urged by a spring 47 in the valve chamber V. It is separated from a stepped portion 61 of the sleeve 32 by the smaller diameter portion 36a of the fluid pressure drive piston 36 as shown in FIG. 3. A cut-out 43a is formed at an end portion of the valve body 43. When it contacts with the stepped portion 61, a throttle path is formed between the valve chamber V and the conduit 16a side. Further, paths 44, 45 and 46 are formed in the housing 31. They are connected to the conduits 5a, 16a and 9a, respectively.

A fluid pressure chamber 62 is formed between the fluid pressure drive piston 36 and the sleeve 32. It communicates through the conduit 9a and the dumper 14a to the output side of the fluid pressure pump 10. A predetermined pressure to change over into the throttling position of the throttling valve apparatus 6a is determined by a spring force of the spring 38 urging the fluid pressure drive piston 36, and the fluid pressure receiving area of the fluid pressure drive piston 36.

There has been described the fluid pressure control apparatus for the anti-skid apparatus. Next, operations of the fluid pressure apparatus will be described.

When the brake pedal 4 is trodden, fluid pressure is generated through the amplifying operation of the booster portion 2 in the fluid pressure generating portion 3. The fluid pressure is transmitted through the conduits 5a and 5b to the front and the rear wheels diagonally connected to each other. Since both of the brake fluid system are equal in construction to each other, only one of them will be described. The fluid pressure from the conduit 5a is transmitted into the hole 44 in the check-throttling valve apparatus T. Further, it flows through the valve chamber V, the fluid path formed around the valve body 43, and the fluid path formed around the small diameter portion 36a of the fluid pressure drive piston 36 and the hole 45 into the conduit 16a side and through the inlet valve 17a and conduit 18a into the wheel cylinder of the left rear wheel RL. And the fluid pressure is transmitted also through the conduit 16a' divided from the conduit 16a, the inlet valve 20a and the conduit 22a into the wheel cylinder of the right front wheel FR. Similarly, the fluid pressure is transmitted through the conduit 5b into the wheel cylinders of the right rear wheel RR and left front wheel FL. Accordingly, all of the wheels are braked.

Accoding to this invention, both of the front wheels FR and FL are independently controlled of the other wheels by the control unit E. First, control operation of the front wheels FR and FL will be described. When the control unit E judges that the brake should be decreased, (for the facilitation of the understanding, the skid conditions of the front wheels FR and FL are assumed to be the same to each other), the solenoid portions of the inlet valves 20a and 20b are energized. Thus, the conduit 22a side and the conduit 16a side and the conduit 22b side and the conduit 16b side are interrupted from each other. Further, the solenoid portions of the outlet valves 24a and 24b are energized to make the conduit 22a, 22b side and the conduit 26a, 26b side communicating to each other. The brake fluid is discharged through the outlet valves 24a and 24b into the hydraulic reservoir 25a, 25b from the wheel cylinders of the right front wheel FR and left front wheel FL. At the same time, the fluid pressure pump 10 starts to be driven and so at once the brake fluid is sucked from the hydraulic reservoirs 25a and 25b. The pressurized fluid flows through the check valves 13a, 13b into the dumpers 14a and 14b. Thus, the pulsating pressure of the fluid pressure pump 10 is greatly decreased and then it is transmitted to the fluid pressure supply conduits 16a, 16b connecting the throttling valve apparatus 6a, 6b with inlet valves 20a and 20b.

On the other hand, the output side of the fluid pressure pump 10 is connected to the throttling valve apparatus 6a, 6b. As shown in FIG. 3, the discharging pressure of the fluid pressure pump 10 is transmitted into the fluid pressure pump pressure chamber 62 formed between the large diameter portion of the fluid pressure drive piston 36 and the sleeve 32. When the pressure of the fluid pressure pump pressure chamber 62 reaches the predetermined pressure, the fluid pressure drive piston 36 is moved rightward in cylinder 31a against compression spring 38 received in chamber 60, and therefore its smaller diameter portion 36a is also moved rightward. Chamber 60 is vented to atmosphere via port 39. The valve body 43 comes to contact with the stepped portion 61 by spring force of the spring 47. Therefore, the cut-out 43a functions as a throttle. After that time, the fluid pressure from the master cylinder side is transmitted through the throttle into the conduit 16a, 16b side. Before the cut-out 43a functions as the throttle, the brake can be rapidly applied. Since the dumper 14a, 14b and the throttle valve apparatus 6a, 6b are arranged, the hammering sound due to the increasing pressure acceleration of the brake fluid pressure, when the brake is reapplied during the anti-skid control operation, can be greatly decreased or almost cancelled. Thus, the vehicle vibration can be greatly decreased or it can be almost cancelled. Accordingly, the driver and passenger feel very good. In the Prior Art, the above hammering sound and the vibration are transmitted to the connecting portion between one combination of the brake pedal and the booster, the connecting portion between another combination of the master cylinder and fluid pressure control valve, or to the connecting portion between a further combination of the fluid pressure control valve and wheel cylinder, and the vehicle. However, according to this embodiment, serial connecting circuits consisting of the throttling valve apparatus 6a, 6b and the dumper 14a, 14b are arranged between the outlet ports of the fluid pressure pump 10 and the master cylinder 1, and so the hammering sound and the vibration can be greatly decreased or it can be almost zero.

When the brake is relieved, the brake fluid from the wheel cylinder is transmitted through the hole 45 to which the conduit 16a, 16b is connected, and the path formed around the small diameter portion 36a of the fluid pressure drive piston 36 to the valve body 43. Accordingly, it is pushed leftward against the spring force of the spring 47 in FIG. 3. Thus, the check valve-throttling valve apparatus T, comes to function as check valve. Accordingly, the pressurized fluid from the wheel cylinder can be rapidly returned into the master cylinder 1 and so the brake can be rapidly relieved.

Next, a logic part of the control unit E will be described with reference to FIG. 4. Input signals are formed in a judge part of the control unit E which has a well-known circuit construction. It includes a slip signal generator, a differentiator, an approximate vehicle speed forming circuit, etc, and judges the skid conditions of the wheels on the basis of the outputs of the wheel speed sensors.

Figure 4:
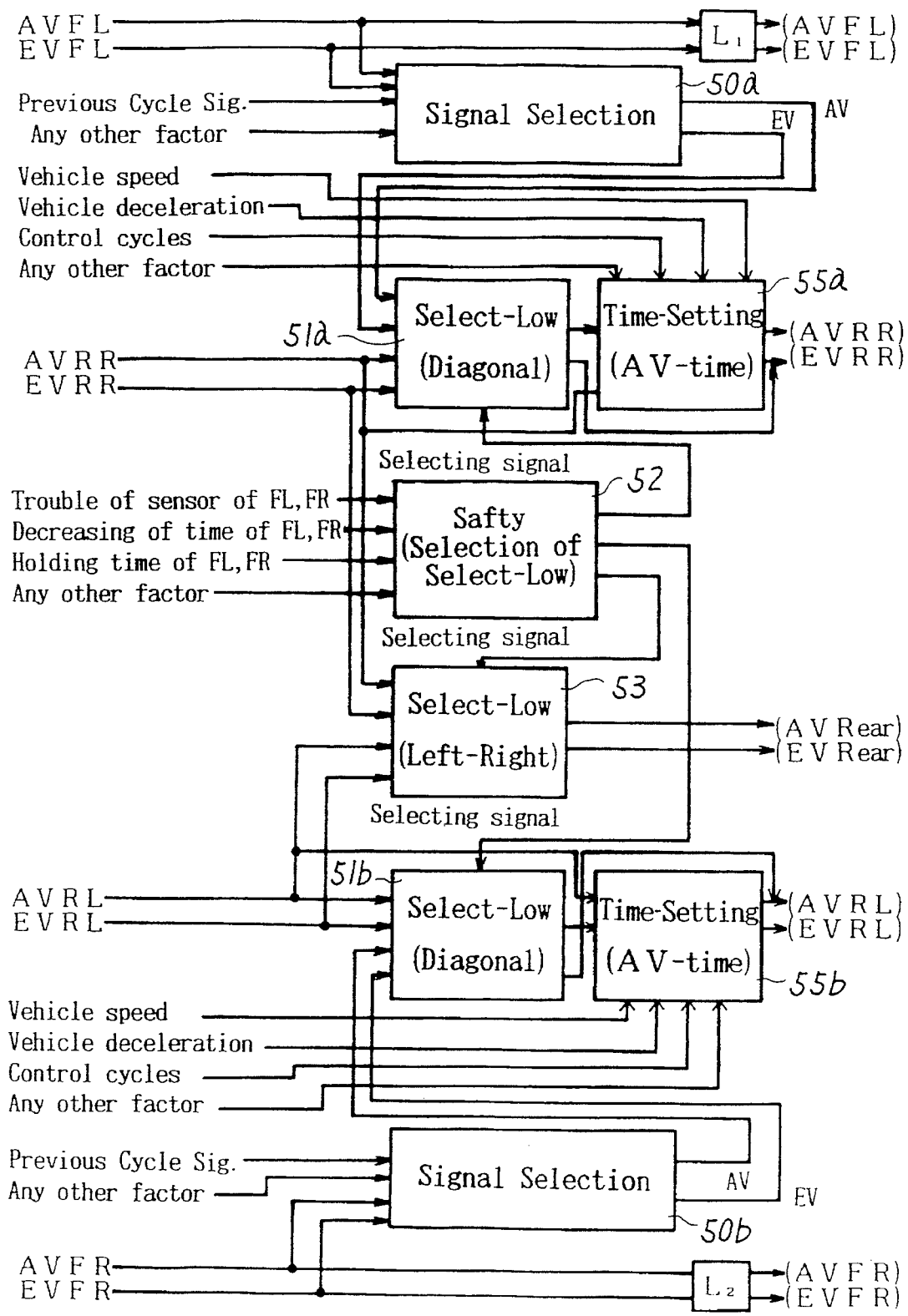
FIG. 4 is a block diagram of an important part of control unit used in the first embodiment.

In FIG. 4, control signals AVFL, AVRR, AVRL and AVFR represent AV signals for decreasing brake fluid pressures of the front left wheel (FL), rear right wheel (RR), rear left wheel (RL) and front right wheel (FR), respectively. Control signals EVFL, EVRR, EVRL and EVFR represent EV signals for holding brake fluid pressures of the front left wheel (FL), rear right wheel (RR), rear left wheel (RL) and front right wheel (FR), respectively. Output signals (AVFL), (AVRR), (AVRL) and (AVFR) are drive signals (AV) for driving valves to decrease the brake fluid pressures of the wheels FL, RR, RL and FR, respectively. Output signals (EVFL), (EVRR), (EVRL) and (EVFR) are drive signals (EV) for driving valves to hold the brake fluid pressures of the wheels FL, RR, RL and FR, respectively. And output signals (AV Rear) and (EV Rear) are drive signals (AV) for driving valves to decrease and hold both of the brake fluid pressures of the rear wheels RL and RR, respectively.

The control signals AVFL and EVFL are supplied to a signal selection circuit 50a. Further, a previous cycle control signal of the left front wheel (FL) and another factor representing any control condition of the wheel FL are supplied to the signal selection circuit 50a. The previous cycle control signal represents a control signal previous directly to the present control signal. It is obtained from the memory of the computer in the control unit E that the AV signal or EV signal has been previously generated from the wheel FL. Various signals can be considered as the other factor in accordance with the skid condition of the wheel FL. For example, when the signal selection circuit 50a receives a control signal AVFL, it generates a AV control signal and/or EV control signal by its logic. Such an output is supplied to a first select-low (diagonal) circuit 51a. A select-low control is effected between the front wheel FL and the rear wheel RR connected diagonally to the front wheel FL, by the first select-low circuit 51a. The AVRR and EVRR signals are further supplied to the first select-low circuit 51a for the above-mentioned select-low.

Similarly, the control signals AVFR and EVFR are supplied to another signal selection circuit 50b. Further, a previous cycle control signal of the right front wheel (FR) and another factor representing any control condition of the wheel FR are supplied to the signal selection circuit 50b. The previous cycle control signal represents a control signal previous directly to the present control signal. It is obtained from the memory of the computer in the control unit E that the AV signal or EV signal has been previously generated from the wheel FR. Various signals can be considered as the other factor in accordance with the skid condition of the wheel FR. For example, when the signal selection circuit 50b receives a control signal AVFR, it generates a AV control signal and or EV control signal by its logic. Such an output is supplied to another first select-low (diagonal) circuit 51b. A select-low control is effected between the front wheel FR and the rear wheel RL connected diagonally to the front wheel FR, by the other first select-low circuit 51b. The AVRL and EVRL signals are further supplied to the select-low circuit 51b for the above-mentioned select-low.

Signals detecting any trouble of the wheel speed sensors associated with the front wheels FL, FR, representing the durations of the decreasing times of the brake fluid pressures of the front wheels FL, FR, representing the durations of the holding times of the brake fluid pressures of the front wheels FL, FR and representing any other factors of the conditions of the front wheels FL, FR, are supplied to a safety circuit 52. For example, the signal detecting any trouble of the wheel speed sensors is asignal detecting an electrical disconnection. The safety circuit 52 includes a software which fulfils the functions of timer, flip-flop, comparator etc. The operation logic of the safety circuit 52 can be obtained by the above soft-ware. The output of the safety circuit 52 is supplied as a selecting signal to the first select-low circuits 51a, 51b and a second select-low circuit 53. The selecting signal is a signal for selecting one of the diagonal Select-Low control and left-right Select-Low control. The "diagonal Select-Low" represent the "Select-Low" between the rear wheel and the front wheel connected diagonally to the said rear wheel. The "left-right Select-Low control" represents the "Select-Low" between the rear wheels.

The outputs of the first select-low circuits 51a, 51b are supplied to time-setting circuits 55a and 55b. Further, signals representing the control condition of the vehicle such as vehicle speed, vehicle deceleration, the number of the control cycles of the front wheel, any other factor. Usually, brake application, brake holding and brake decreasing are repeated during the anti-skid control. The number of the control cycles means the number of the repitions of the above cycles. The wheel is sooner put into anti-skid control on the lower-μ road. The number of the control cycles is larger. Further, the control signals AVRR and AVRL are supplied to the time-setting circuits 55a and 55b, respectively. The AV time, namely the brake decreasing time is determined on the basis of the signals representing the present control condition of the vehicle such as the vehicle speed, vehicle deceleration, the number of the control cycles and any other factor, by a predetermined calculation of the time-setting circuits 55a and 55b, respectively. Thus, the valve driving signals (AVRR), (EVRR) and (AVRL), (EVRL) are generated from the time-setting circuits 55a and 55b for the right and left rear wheels RR and RL, respectively.

Since the wheel speed sensors are associated with all of the wheels, respectively, the control signals AVFL, EVFL, AVFR, EVFR, AVRL, EVRL, AVRR and EVRR are independently generated from the wheels FL, FR, RL and RR. The AV signal which represents any one of the valve drive signals (AVFL), (AVFR), (AVRL) and (AVRR), is supplied to the solenoid portions of the change-over valve 17a, 17b, 20a, 20b, 23a, 23b, 24a, 24b, and the EV signal which represents any one of the valve drive signals (EVFL), (EVFR), (EVRL) and (EVRR), is supplied to the solenoid portion of the change-over valves 17a, 17b, 20a and 20b.

The control signals of the previous control cycles are supplied as the control conditions of the front wheels FL and FR to the signal selecting circuits 50a and 50b, respectively. For example, when the AV control signal, AVFL or AVFR is generating at present, the time of the duration is time-shared to predetermined time, and the previous control signal is supplied as the output.

When the EV control signals are supplied to the signal selecting circuits 50a, 50b, the latters generate, as it is, the EV signals. However, when the AV control signals are supplied to the signal selecting circuits 50a, 50b, the latters generate, as it is, the AV signals, or the EV signals, in accordance with the control condition of the front wheel, or the EV signals at a predetermined rate. "Select-Low" is effected between the above outputs and the AV signal or EV signal of the rear wheel in the select-low circuits 51a and 51b, respectively. The selected signal is supplied to the time-setting circuit 55a, 55b. The time of the valve drive signal (AVRR) or (AVRL) is determined by the time-setting circuit 55a, 55b. According to this embodiment, it is determined by the time-seting circuit 55a, 55b how many percentages of the selected output AV is used as the valve drive signal AV for the rear wheel. The ratio of the brake decreasing time to the brake holding time is varied for the percentages. In the other words, the solenoid portions of the change-over valves are alternately and intermittently energized. The so-called "stepwise decreasing" is effected. The step height of the stepwise decreasing is set in the time-setting circuits 55a and 55b. However, instead of the stepwise decreasing, for example, 30% of the AV signal at the initial may be used for brake-decreasing and 70% (remaining) of the same AV signal may be used as the EV-signal for holding the brake, as the case may be, in the time-setting circuits 55a and 55b.

The safety circuit 52 is so designed as to select one of the first select-low circuits 51a, 51b and the second select-low circuit 53 in accordance with the existance of the signal detecting the sensor trouble and the duration time of the brake-decreasing signal of the front wheel, that of the brake holding signal of the front wheel or that of the other factor. For example, when the duration time of the brake-decreasing operation of the front wheel becomes longer than a predetermined time set in the safety circuit 52, the operation of the select-low circuits 51a, 51b is stopped, and the select low circuit 53 (Left-Right select-low control) is started to operation. In other words, the change-over valve for the rear wheel is driven by the select-low-signal between the rear wheels. Or when the signal detecting the sensor trouble of the front wheel is generated due to electrical disconnection or shot-circuit, operation of the select-low circuit 51a and 51b is stopped and the select-low circuit 53 is started to operate, since an anti-skid control cannot be securely effected by the select-low between the front wheel and the rear wheel diagonally connected to the same front wheel. When the long decreasing signal of the front wheel dissipates and a duration of a newly generated decreasing signal of the front wheel is shorter than the predetermined time set in the safety circuit 52, the latter is recovered into the initial condition. Thus, the select-low circuits 51a, 51b are put into the operative state, and the select-low circuit 53 is put into the inoperative state.

The select-low circuit 51a, 51b or the select-low circuit 53 are, or is put into the operative state in responce to the signals supplied to the safety circuit 52.

According to one embodiment of this invention, the fluid pressure control method for the anti-skid control apparatus for the rear wheels RL and RR are effected in the above manner. Next, operation of the fluid pressure control method will be described.

The usual braking operation has been described in the above. Now, anti-skid control operation will be described.

Figure 5:
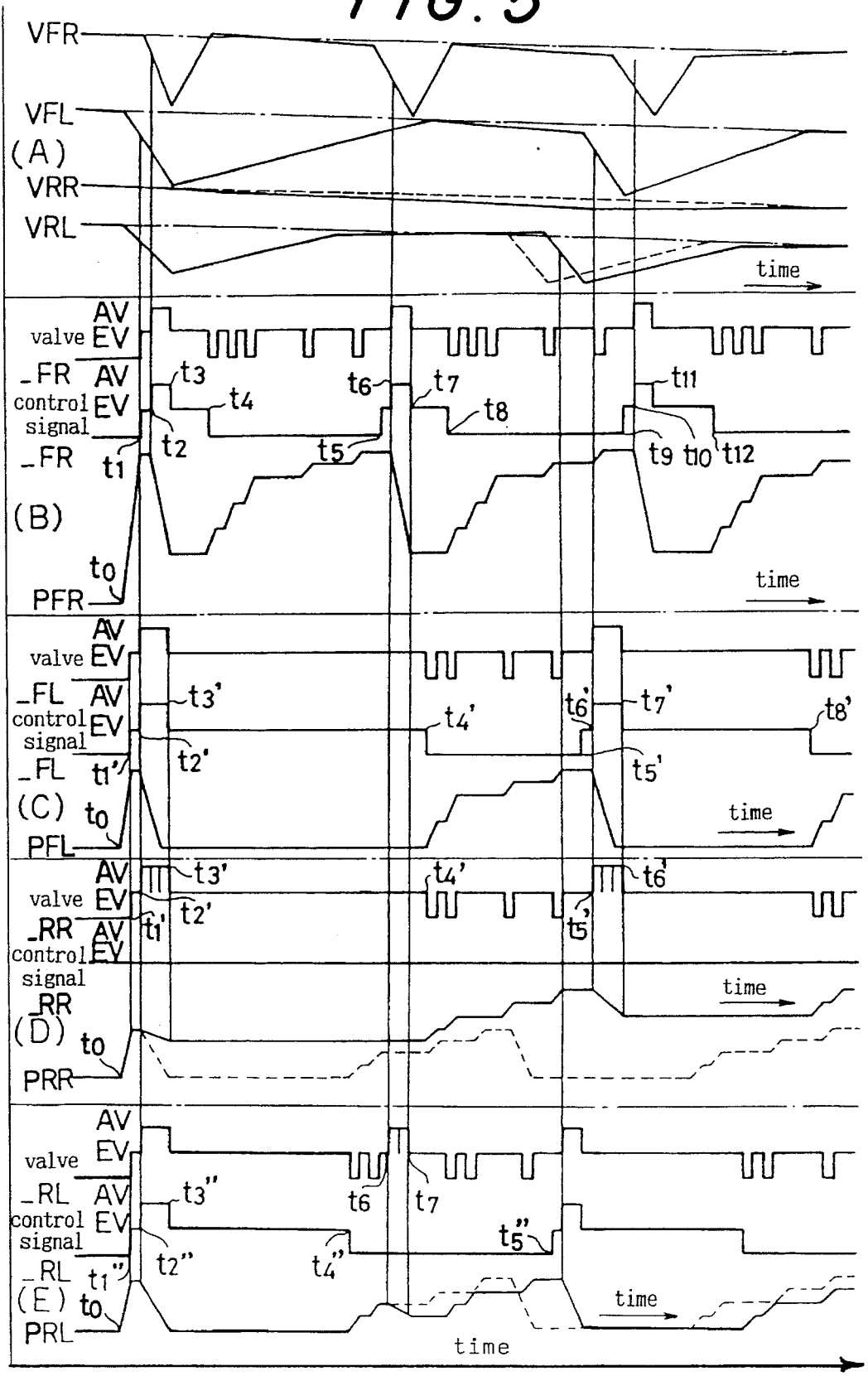
FIG. 5 is a time-chart explaining the operation of the first embodiment.

In FIG. 5, (A) represents the wheel speeds VFR, VFL, VRR and VRL of the right front wheel, left front wheel, right rear wheel and left rear wheel, respectively, after depressing the brake pedal. (B) shows a valve change-over drive signal for the right front change-over valves 20a, 24a, the control signal representing the judge result of the right front wheel FR and the brake fluid pressure PFR obtained on the basis of the control signal of FR. Similarly(C), (D) and (E) show valve drive signals of the change-over valves (17a, 23a) (17b, 23b) (20b, 24b) for the left front wheel, for the right rear wheel and the left rear wheel, the control signals showing the judge results of them and brake fluid pressures PFL, PRR and PRL controlled on the basis of the control signal.

When the driver tread the brake pedal 4 at time $t_0$, the wheel speeds of front wheels FR, FL and of the rear wheels RR, RL dercrease as shown in FIG. 5(A) (it is assumed that the vehicle is running on the split road and the left side is of low-μ side and the right side is of high-μ side. Thus, the wheel speeds change in FIG. 4(A). The control signal FR representing the judging result of the right front wheel becomes level ½ at time $t_1$. Thus, the EV signal is generated. And it becomes level 1 at time $t_2$. Thus, the signal AV is generated. The AV signal continues till the time $t_3$. The level becomes ½ at time $t_3$. The AV signal becomes EV signal, and it continues by time $t_4$. The level is zero till time $t_5$. The valve is driven by the control logic $L_2$. When the signal becomes zero after time $t_4$, a pulse signal of constant duty cycle is generated by the software in the control logic $L_2$. After the pulse continues for a predetermined time, the duty cycle is changed. Rectangular pulses, the width of which becomes shorter with times are generated. Thus, the brake fluid pressure PFR applied to the wheel cylinder of the right front wheel FR changes as shown in FIG. 4(B). It increases during times $t_0$ and $t_1$. The brake is maintained for the time between times $t_1$ and $t_2$ and it decreases during the time between times $t_2$ and $t_3$. And the brake fluid is maintained during times $t_3$ and $t_4$.

Hereafter, the change over valve is operated in accordance with the logical construction $L_2$ of the controlunit. The fluid pressure is setpwisely increased by the above described pulses which consist of the two pulses of the constant width and the pulses of the changing duty cycle. The holding times of the pulses of changing duty cycle are relatively long and they are shortened stepwisely with time.

The control signal FR becomes again level ½ at time $t_5$. However, the valve drive signal is unchanged. And it becomes level 1 at time $t_6$. The fluid pressure PFR is decreased. It becomes level ½ at time $t_7$ and the level continues till time $t_8$. The fluid pressure PFR is maintained at constant during the time. It becomes level zero during the time between time $t_8$ and $t_9$. Thus, the brake fluid pressure PFR is controlled as in the above first control cycle. It becomes again level ½ at time $t_9$ and it is maintained till time $t_{10}$ and it becomes level 1. And it is lowered to level ½ at time $t_{11}$. Next, it continues till time $t_{12}$ and it becomes level zero. Also in this case, the brake fluid pressure control is effected in the same manner as the second control cycle by the logic $L_2$ of the control unit E. Thus, the fluid pressure PFR of the front wheel FR is independently controlled of the other front wheel and rear wheels. The brake fluid pressure PFL of the left front wheel FL is controlled in the same manner as the brake fluid pressure PFR of the right front wheel FR.

The control signal FL becomes ½ at time $t_1'$ and it becomes 1 at time $t_2'$. It becomes again ½ at time $t_3'$ and it continues till time $t_4'$. Thus, the brake fluid pressure of the left front wheel changes as shown by PFL. When the control signal FL becomes zero at time $t_4'$, the wheel cylinder pressure of FL is stepwisely icreased by the pulse drive for the predetermined time, by the logic $L_1$ of the control unit E.

Next, it is driven by the pulses of the changing duty cycle. The control signal FL becomes ½ at time $t_5'$ and it becomes 1 time $t_6'$. The brake fluid pressure PFL is controlled in the same manner as the previous control cycle. Thus, the fluid pressure of the left front wheel FL is controlled in the same manner as the front wheel FR.

Next, there will be considered the right rear wheel RR. Since the right rear wheel RR is rnnning on the high-μ side of the split road, no control signal is generated from the right rear wheel RR as shown 5 (E). However, the valve change-over signal RR changes as shown in FIG. 5(E). Since the control signal of the left front wheel FL diagonally connected to the right rear wheel RR becomes ½ at time $t_1'$, the valve drive signal RR of the right rear wheel RR becomes ½ at the same time $t_1'$. The control signal FL becomes 1 at time $t_2'$ and so the change-over valve signal for the right rear wheel RR becomes 1 at the same time $t_2'$. However, while the brake decreasing signal AV of the left front wheel FL is continuous, the brake of the right rear wheel RR is decreased for the set-time of the time-setting circuit 55a as shown by the two fine lines. Thus, the fluid pressure of the right rear wheel RR is stepwisely decreased, although it is not clealy shown. Accordingly, the fluid pressure of the front wheel FL is decreased till time $t_3$ as shown by PRR. However, the change amount of the fluid pressure decrease during the time $t_2'$ and $t_3'$ is smaller than that of the front wheel FL. In other words, the inclination of the brake decreasing pressure as shown is smaller. And the brake fluid decrease is smaller than that of the left front wheel FL. The valve change signal RR becomes ½ with the control signal of the left front wheel FL by the logical construction shown in Fog. 4. Thus, the change over valve signal for the right rear wheel RR becomes ½ and so the braking force is maintained at constant. The control signal of the left front wheel FL becomes 1 during the time between times $t_3'$ and $t_4'$.

Next, there will be considered the left rear wheel RL. The control signal RL changes as shown in FIG. 5(E). Since the left rear wheel is running on the low-μ side of the split road, it generates the control signal RL as shown. Thus, it becomes ½ at times $t_1''$ and becomes 1 at time $t_2''$. It becomes ½ at time $t_3''$ and it becomes zero at time $t_4''$. The change of the control signal will be compared with the control signal of the right front wheel FR diagonally connected to the rear wheel RL. The select-low is effected. However, the control signal is preferentially used from the self-rear wheel. Thus, the PRL changes as shown. While the control signal RL is zero during the time between times $t_4''$ and $t_5''$, the valve change-over signal RL becomes 1. The signal of level 1 as above described is generated from the right front wheel FR diagonally connected to the rear wheel RL. Thus, the level becomes 1 by the select-low control. However, the duration of the control signal AV of the front wheel FR is not entirely used, but it is used only for thetime set in the time-setting circuit 55b to decrease the brake. According to the embodiment of this invention, the brake fluid is stepwisely decreased. Accordingly the decreasing amount of the brake fluid pressure is smaller in comparison with that of the front wheel FR.

The brake fluid pressure control of the rear wheel are effected as above described in the above described Prior Art. The brake fluid pressure PRR and PRL of the rear wheels are changed by the dash lines in FIG. 5(D) and (E). Thus, the brake fluid pressures PRR and PRL of the rear wheels are changed in the same manner, in the Prior Art. Accordingly, the Prior Art has the above described disadvantages stated in the description of the Prior Art. However, according to this embodiment, the above disadvantages have been overcome. There has been described the case that the wheel speed sensors associated with the front wheels are normal or in order, and that the decreasing time or the holding time of the front wheel is shorter than the predetermined time set in the safety circuit 52. For example, when the decreasing time of the front wheel is longer than the predetermined time set in the safety circuit 52, the select-low control is not effected by the diagonal select-low circuit 51a, 51b, but it is effected by the left-right select-low circuit 53. Thus, it is prevented that the brake is too much decreased. Accordingly, the braking distance can be much shortened. When the time of the brake decreasing operation is longer or when the change over valve for the front wheel is locked at the brake decreasing position, the select-low between the front and rear wheels is stopped and so the select-low between the rear wheels is effected. Thus, the braking force can be secured by the rear wheels. No-brake is prevented. When the holding time is longer than the predetermined time, that holds true. When the decreasing time becomes shorter than the predetermined time, the diagonal select-low between the front and rear wheels is effected again by the select-low circuits 51a and 51b. Accordingly, the brake fluid pressure is changed in the manner shown in FIG. 5.

In the above manner, the braking distance can be shortened more than Prior Art and the yaw-moment can be decreased. Thus, the steering stability can be secured. In the Prior Art, the brake fluid pressure of the rear wheels are changed by the dash lines in FIG. 5(D) and (E) by the select-low between the rear wheels. The brake fluid pressure is not so much decreased in FIG. 5(E) but the brake fluid pressure is much decreased in FIG. 5(D) and so the braking distance is lengthened. It will be understood that the disadvantages of the Prior Art has been improved by this embodiment.

Figure 6:
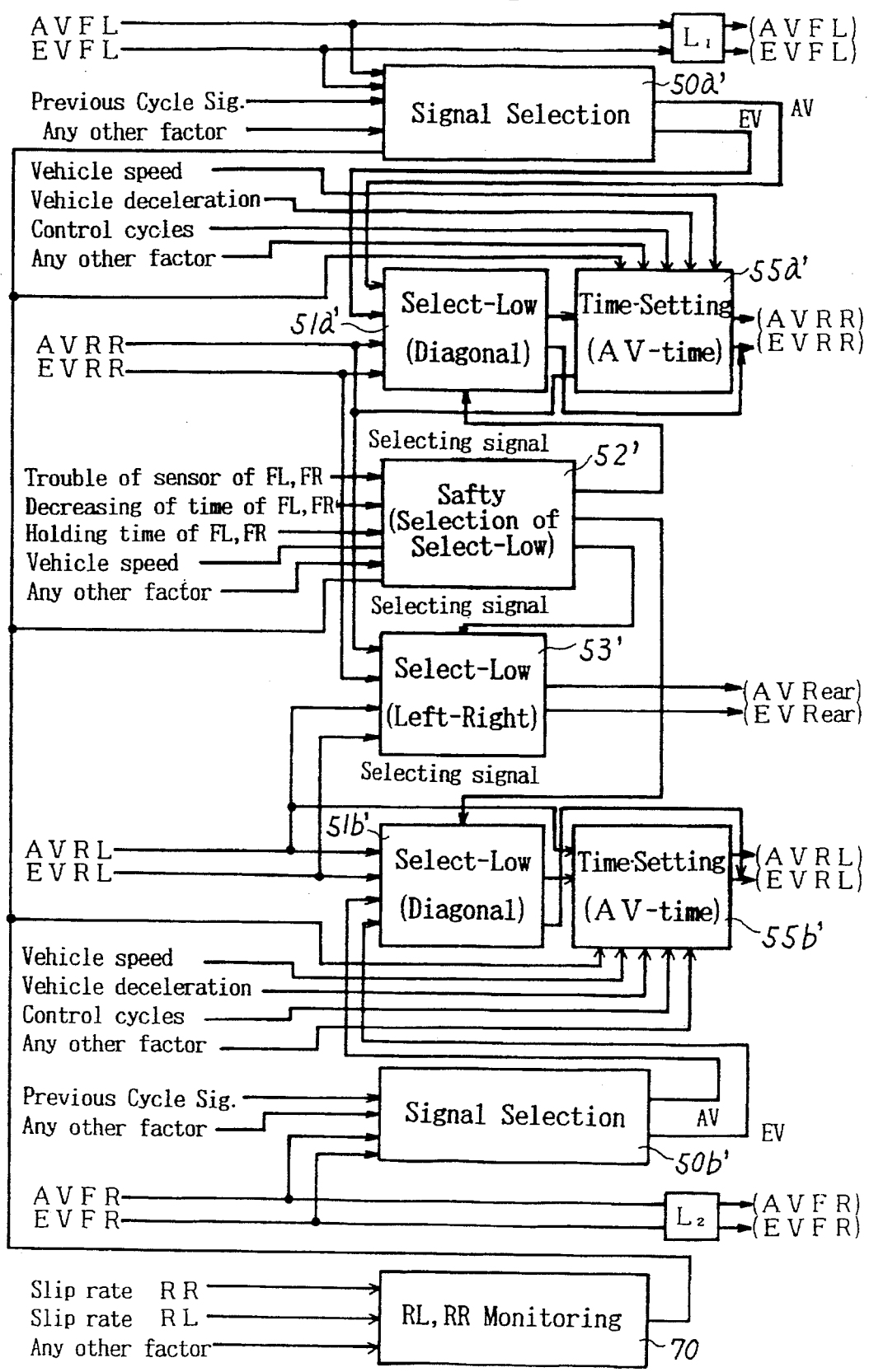
FIG. 6 is a block diagram of an important part of the control unit used in the second embodiment of this invention.

FIG. 6 shows a logical circuit according to the second embodiment of this invention. In this embodiment, a rear wheel monitoring circuit 70 is added. The output of the rear wheel monitoring circuit 70 is supplied to the signal selecting circuits 50a', 50b', the select-low cicuits 51a', 51b', the time setting circuits 55a', 55b' and a control mode selecting circuit 52'. Slip rates of the rear wheels RR and RL are supplied to the rear wheel monitoring circuit 70. Time when the rear RR and RL are smaller than a determined slip ratio set in the rear wheel monitoring circuit 70, is accumulated. And when the slip ratio of at least one of the rear wheels is larger than the predetermined slip ratio, the accumulated time is subtracted by the time that it is lalaer. The use percentages of the control signals of the front wheels FL and FR for decreasing the brake pressure of the rear wheels are set in the time-setting circuits 55a' and 55b' in response to the accumulated time. The start point of the accumulation that the slip ratio of the rear wheel is smaller than the predetermined slip ratio, is the time when the brake pedal 4 is started to depress or the time the initial brake holding control signal or the initial brake decreasing control signal has been generated from front wheels or the rear wheels. The signal selecting circuits 50a' and 50b' fulfil the function of the first embodiment also. When the accumulated time is longer than the predetermined time, or when the stable condition continues for longer than the predetermined time, the signal selecting circuits 50a' and 50b' outputs only the holding signal or the increasing signal. It does not output the decreasing signal. Thus, the fluid pressure control valve for the rear wheel receive only the holding instruction or the increasing instruction. In such a manner, the same effect as the alteration of the preferential order between the select-low controls can be obtained. When the accumulated time is longer than a second predetermined time that is longer than the first mentioned predetermined time, the select-low circuit 53' is selected by the control mode selecting circuit 52' and so the control is changed over into the select-low control between the rearwheels.

Further in this embodiment, a vehicle speed signal beside the input signals to the safety circuit 52' of the first embodiment is supplied to the control mode selecting circuit 52'. When the vehicle speed is lower than a predetermined vehicle speed set in the control mode selecting circuit 52', the select-low circuit 53' is selected in contrast to the safety circuit 52 of the first embodiment.

According to the second embodiment, when relatively large load is applied to the rear wheels, the braking distance can be more shortened than in the first embodiment. The stable condition of the rear wheels can be detected by the monitoring of the slip ratio of the rear wheels. When the accumulated time is longer than the predetermined time, it is judged that a sufficient braking force is not imparted to the rear wheels. Thus, the brake decreasing instruction and the brake holding instruction are supplied to the fluid pressure control valves for the rear wheels in accordance with the output by the time-setting circuits 55a' and 55b'. Accordingly, the braking distance can be so controlled to be more shortened. And when the accumulated time is longer than the predetermined time, the diagonal select-low control is changed over into the left-right select-low control by the control mode selecting circuit 52'. When a relatively large load is applied to the rear wheels, more suitable braking force can be applied to the rear wheels and so the braking distance can be more shortened. Further, the vehicle speed is supplied to the control mode selecting circuit 52'. When the vehicle speed is lower than the predetermined vehicle speed, the control is changed over into the left-right select-low control. When the vehicle speed is lower than the predetermined value, the stability of the vehicle running on the split road or on the cornering is not so much deteriorated even by the right-left select-low. Thus, the braking forces to the rear wheels can be sufficient.

As above described, the second embodiment has the effect that the braking distance can be more shortened when the relatively large load is applied to the rear wheels, in addition to the effect of the first embodiment.

While the preferred embodiments have been described, variations thereto will occur to those skilled in the art within the scope of the present inventive concepts which are delineated by the following claims.

For example, in the above embodiments, the stepwise decreasing signal is obtained from the time-setting circuits 55a, 55b, using the output signal AV supplied from the select-low circuits 51a, 51b. Insteads, the time-setting circuits 55a, 55b may be so designed as to generate the valve change over signal which decreases continuously the brake fluid for one time and hold the braking force for another time.

Further, in the above embodiments, the change over valves 17a, 17b, 20a, 20b, 23a, 23b, 24a, 24b receiving the AV signal or EV signal are two-port two-position electro-magnetic change-over valves. The two change-over valves are used for the one wheel. Instead, one three-port three-position electro-magnetic change-over valves may be used for one wheel. As above described, control signals of the level zero, ½ and 1 is supplied to a solenoid portion of the one three-port three-position electro-magnetic change-over valveand it is changed over to one of the three position. The control signal in FIG. 5 has level of ½ (EV signal) or level 1 (AV signal). The signal of the same level may be used for the change-over valve. The same control operation can be obtained.

Further, in the above embodiment, the X-conduit system has been described. However, this invention can be applied to the H-conduit (front-rear separation type) system. The throttling valve apparatus 6a and 6b and the dumper 14a and 14b may be omitted.

In the above embodiment, this invention is applied to the so called "the circuration type anti-skid apparatus" in which the change-over valve (fluid pressure control valve or solenoid valve) is connected in series with the conventional brake conduits and the brake fluid pressure to the wheel cylinder is directly increased and decreased. Instead, this invention may be applied to the so called "volume-variable type anti-skid apparatus" in which a hydraulic pressure unit is connected in parallel with the conventional brake conduits and its volume is increased and decreased to increase and decrease the brake fluid pressure to the wheel cylinder.

What is claimed is:

1. A fluid pressure control method of an anti-skid control apparatus for a vehicle, said anti-skid control apparatus including;
   (a) a tandem master cylinder,
   (b) wheel cylinders of wheels,
   (c) wheel speed sensors associated with the respective wheels,
   (d) a control unit receiving the outputs of said wheel speed sensors for judging skid conditions of the respective wheels, and
   (e) fluid pressure control valves arranged between said tandem master cylinder and the respective wheels, receiving instructions from said control unit for controlling brake fluid pressures of the respective wheels, and said control unit supplies brake-decreasing instructions and brake-holding instructions independently to the ones of said fluid-pressure control valves for the front wheels, controls the others of said fluid-pressure control valves for the rear wheels by the diagonal "Select Low" between the skid conditions of the respective rear wheels and respective front wheels diagonally connected to said respective rear wheels, and when said brake-decreasing instruction or said brake-holding instruction is supplied to the fluid pressure control valve for the rear wheel, on the basis of the control signal representing the skid condition of the front wheel diagonally connected to the said rear heel, the control signal representing the skid condition of the said front wheel is used for the fluid pressure control valve for the said rear wheel, at a predetermined rate responsive to the control condition of the said front wheel and/or the braked condition of said vehicle.

2. A fluid pressure control method of an anti-skid control apparatus for a vehicle according to claim 1, in which said control unit controls the others of said fluid pressure control valves for the rear wheels by the left-right "Select Low" between the skid conditions of the rear wheels, when the time of the brake-decreasing instruction or brake-holding instruction continues for longer than a predetemined time, or when the wheel speed sensor for the front wheel becomes abnormal.

3. A fluid pressure control method of an anti-skid control apparatus for a vehicle, said anti-skid control apparatus including;
   (a) a tandem master cylinder,
   (b) wheel cylinders of wheels,
   (c) wheel speed sensors associated with the respective wheels,
   (d) a control unit receiving the output of said wheel speed sensors for judging skid conditions of the respective wheels, and
   (e) fluid pressure control valves arranged between said tandem master cylinder and the respective wheels, receiving instructions from said control unit for controlling brake fluid pressures of the respective wheels, and said control unit supplies brake-decreasing instructions, brake-holding instructions and brake-increasing instructions independently to the ones of said fluid-pressure control valves for the front wheels, controls the others of said fluid-pressure control valves for the rear wheels by the diagonal "Select Low" between the skid conditions of the respective rear wheels and respective front wheels diagonally connected to said respective rear wheels, and when said brake-decreasing instruction, said brake-holding instruction or said brake-increasing instruction is supplied to the fluid pressure control valve for the rear wheel, on the basis of the control signal representing the skid condition of the front wheel diagonally connected to the said rear wheel, the control signal representing the skid condition of the said front wheel is used for the fluid pressure control valve for the said rear wheel, at a predetermined rate responsive to the control condition of the said front wheel, the braked condition of said vehicle and the stability of the rear wheels.

4. A fluid pressure control method of an anti-skid control apparatus for a vehicle according to claim 3, in which said control unit controls the others of said fluid pressure control valves for the rear wheels by the left-right "Select Low" between the skid conditions of the rear wheels, when the time of the brake-decreasing instruction or brake-holding instruction continues for longer than a first predetermined time, or when the wheel speed sensor for the front wheel becomes abnormal, or when the stability of the rear wheels is obtained continuously for longer than a second predetermined time.

5. A fluid pressure control method of an anti-skid control apparatus for a vehicle according to claim 4, in which said stability of the rear wheels is designated as that slip value or slip ratio when any one of the rear wheels is smaller than a predetermined value.

6. A fluid pressure control method of an anti-skid control apparatus for a vehicle according to claim 3, in which the control signal utilized for representing the skid condition of the front wheel is said brake-holding instruction or said brake-increasing instruction, existing when the stability of the rear wheels is obtained continuously for a third predetermined time which is shorter than said second predetermined time, or when the stability of the rear wheels is accumulatedly obtained for said third predetermined time.

7. A fluid pressure control method of an anti-skid control apparatus for a vehicle, said anti-skid control apparatus including;
   (a) a tandem master cylinder,
   (b) wheel cylinders of wheels,
   (c) wheel speed sensors associated with the respective wheels,
   (d) a control unit receiving the output of said wheel speed sensors for judging skid conditions of the respective wheels, and
   (e) fluid pressure control valves arranged between said tandem master cylinder and the respective wheels, receiving instructions from said control unit for controlling brake fluid pressures of the respective wheels, and said control unit supplies brake-decreasing instructions and brake-holding instructions independently to the ones of said fluid-pressure control valves for the front wheels, controls the others of said fluid-pressure control valves for the rear wheels by the diagonal "Select Low" between the skid conditions of the respective rear wheels and respective front wheels diagonally connected to said respective rear wheels, when the speed of said vehicle is higher than a predetermined value, and when said brake-decreasing instruction or said brake-holding instruction is supplied to the fluid pressure control valve for the rear wheel, on the basis of the control signal representing the skid condition of the front wheel, the control signal representing the said skid condition of the front wheel is used for the fluid pressure control valve for the said rear wheel, at a predetermined rate responsive to the control condition of the front wheel and/or the braked condition of said vehicle, and when the speed of said vehicle is lower than said predetermined speed, said control unit controls said other fluid pressure valves for the rear wheels by the left-right "Select Low" between said rear wheels.

* * * * *